United States Patent [19]
Ezell et al.

[11] 4,086,504
[45] Apr. 25, 1978

[54] DISTRIBUTED DATA ACQUISITION

[75] Inventors: George D. Ezell; Marvin L. Murphy, Jr., both of Dallas; Paul D. Davis, Jr., Garland, all of Tex.

[73] Assignee: Texas Instruments Incorporated, Dallas, Tex.

[21] Appl. No.: 410,938

[22] Filed: Oct. 29, 1973

[51] Int. Cl.² .............................................. G01V 1/22
[52] U.S. Cl. ......................... 340/15.5 TS; 340/152 T; 340/167 R; 343/6.5 R; 325/65
[58] Field of Search .................... 340/15.5 TS, 152 T, 340/152 R, 167 R; 343/6.5 R

[56] References Cited

U.S. PATENT DOCUMENTS

| | | | |
|---|---|---|---|
| 2,700,753 | 1/1955 | Peterson | 340/15.5 TS |
| 3,062,315 | 11/1962 | Herzog | 340/15.5 TS |
| 3,175,191 | 3/1965 | Cohn et al. | 340/167 R |
| 3,449,720 | 6/1969 | Marino et al. | 340/167 R |
| 3,462,740 | 8/1969 | Kennedy | 340/167 R |
| 3,531,801 | 9/1970 | Huebscher | 343/6.5 R |
| 3,573,819 | 4/1971 | Mason et al. | 343/6.5 R |
| 3,634,826 | 1/1972 | Biedermann | 340/167 R |
| 3,646,580 | 2/1972 | Fuller et al. | 343/6.5 R |
| 3,652,979 | 3/1972 | Angelle | 340/15. 5 TS |
| 3,714,573 | 1/1973 | Grossman | 325/32 |
| 3,719,890 | 3/1973 | Borciani et al. | 340/167 R |
| 3,748,638 | 7/1973 | Montgomery, Jr. et al. | 340/15.5 |
| 3,815,093 | 6/1974 | Caretto et al. | 340/152 T |

Primary Examiner—Howard A. Birmiel
Attorney, Agent, or Firm—Rene E. Grossman; James T. Comfort; Thomas G. Devine

[57] ABSTRACT

In operations such as seismic exploration seismic waves are generated at a shot point. The amplitudes of successive samples of seismic waves appearing at a plurality of detector stations variously spaced from said shot point in the wake of generation thereof are converted to digital codes. The codes from all the detectors are transmitted in sequence and on a real time basis by spread spectrum radio pulses to a master station.

A plurality of data acquisition units each including a radio transponder and a seismic detector are located at each of a plurality of spaced seismic detector stations in a seismic prospect. A master radio station means is located in or adjacent to the prospect. Means in the acquisition units and in the master station means interrogates and sequentially polls the transponder units in real time to secure and store digital samples at the master station of analog signals from the detectors at a fixed sample interval the duration of which is selected in relation to the frequencies of the signals whereby samples portray the time amplitude variations of the signals.

7 Claims, 11 Drawing Figures

DISTRIBUTED DATA ACQUISITION

This invention relates to distributed data gathering operation, and more particularly to real time assembly of time samples of time varying signals at a master station through spread spectrum radio transmission from a plurality of data acquisition units hereinafter referred to as DAU spaced at unknown locations in a prospect. Real time data is transmitted from each DAU to the master station in response to an interrogation code. Range data for each DAU relative to the master station and for a slave station is also assembled.

In seismic exploration for example it is necessary accurately to know the location of shot points and seismic detecting stations at which seismic energy is produced and sensed. In the past a recording station has been connected to shot points and detector locations through cables. All stations are carefully surveyed to determine location thereof in azimuth and elevation. Conventionally, seismic data is transmitted by cable to a recording station where analog data representative of earth motion at the various seismic detectors is converted to digital form. Digital samples of each of the seismic signals are obtained at intervals of 0.002 or 0.004 second. Such digital representations normally are multiplexed and recorded on magnetic tapes for further processing carried out in accordance with procedures available and well known in the art. Representative procedures are carried out in use of systems manufactured, sold, leased and used by Texas Instruments Incorporated of Dallas, Texas and known as DFS I — DFS IV.

The present invention involves the elimination of the cable connection. A master station is located at a known point relative to an area in which signal sources are to be located. Data acquisition units each including a signal input channel are then located where desired throughout the area. The data acquisition units are then sequentially cyclically interrogated from the master station. A different response code is keyed into each DAU. The master station transmits successively an interrogation code in the form of a data pulse set followed by a series of channel sync pulses. In response to each such set, the digital representation in each unit of earth motion is temporarily stored. Each DCAU counts channel pulses. When the count of channel sync pulses coincides with the keyed response code at each unit, that DAU then responds by transmitting an RF signal representative of the stored data signal.

In operations such as seismic exploration the present invention also involves elimination of the position survey operation wherein the master station and a slave station are at known locations relative to a prospect with the DAU at unknown locations. The slave station includes means to respond to and store the arrival time difference between the master station data frame pulse set and DAU transponded range bits. The slave station also responds to an interrogation signal from the master station to transmit to the master station range difference information for each DAU in time sequence.

For a more complete understanding of the present invention and for further objects and advantages thereof, reference may now be had to the following description taken in conjunction with the accompanying drawings in which.

Figure 1:
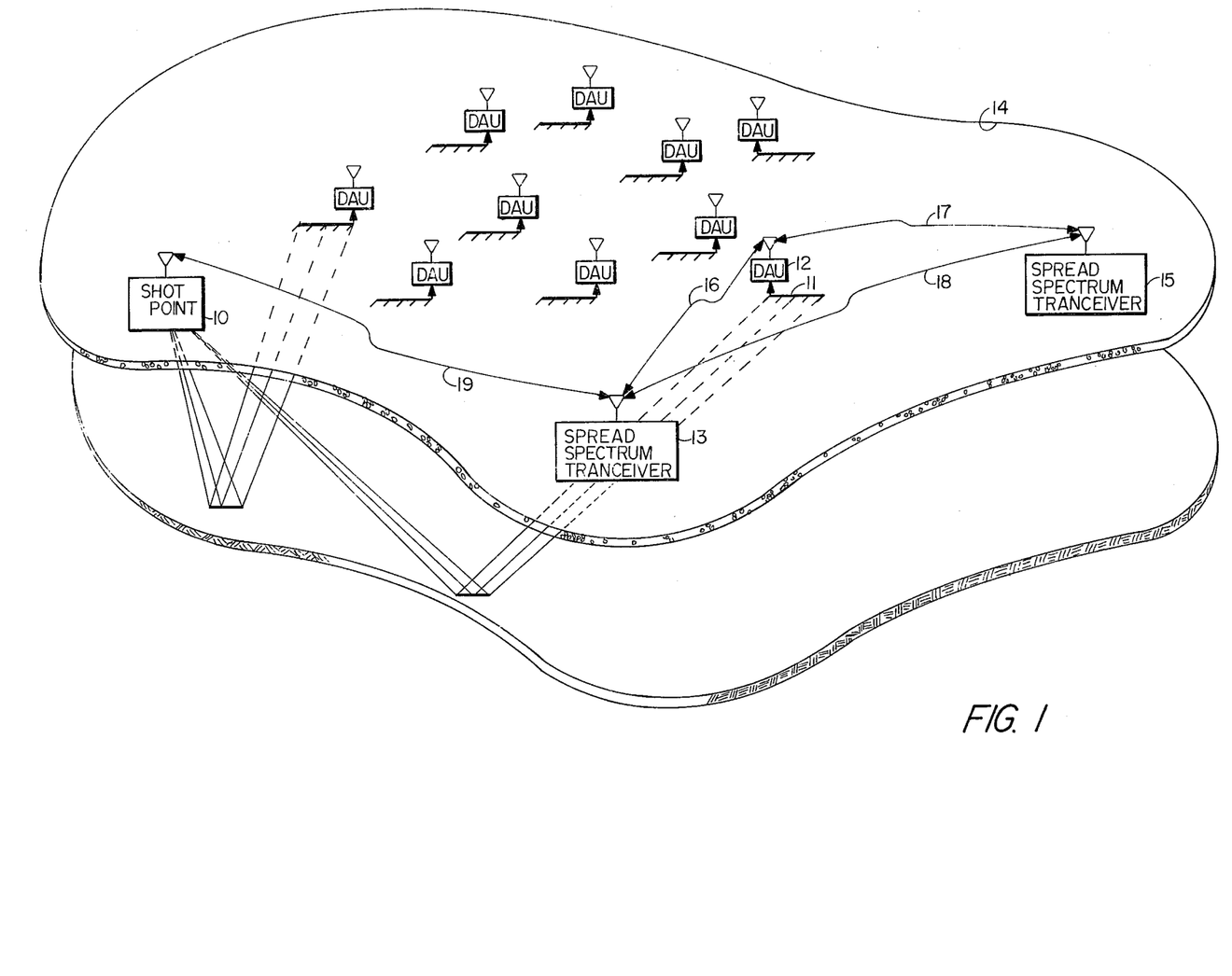
FIG. 1 illustrates a seismic exploration system arrayed over a prospect.

FIG. 1 diagrammatically portrays a seismic exploration system embodying the present invention. Seismic impulses are generated at selected locations such as shot point 10. The resultant seismic waves travel over subsurface paths to subsurface reflecting horizons and back to the surface where they are detected by seismometer arrays, such as the array 11. The seismic waves thus detected are applied as analog signals to a data acquisition unit (DAU) 12.

DAU 12 is a radio frequency transponder which includes means to perform an analog-to-digital conversion of the seismic waves detected in spread 11 and to respond to an interrogation transmission from a master station 13 to transmit to station 13 signals representing the seismic data sensed by the array 11. Companion DAUs are located at selected points throughout an area to be surveyed as illustrated in FIG. 1.

In the past spreads, such as spread 11, have been connected by cables to a recording station 13. At the recording, signals have been multiplexed, converted from analog to digital form followed by storage on magnetic tape. Further, normal operation has been such that the location of the shot point 10 and each of the detector arrays, such as array 11, were accurately surveyed and located both as to azimuth and elevation.

In accordance with the present invention, the seismic data is transmitted by radio in real time to master station 13. Preferably an RF slave station 15 is established within the area 14 to be surveyed. Not only is real time seismic data then accumulated by interrogation over RF channel 16 which extends between master station 13 and DAU 12, but also ranging information is acquired by way of channel 16. Ranging information is acquired by the slave station by way of channels 17 and 18. The ranging data accumulated by the slave station 15 is then acquired over channel 18 by the master station 13. The shot instant, i.e., the instant in time that the seismic rays are generated at shot point 10, is transmitted from master station 13 via the channel 19. By reason of such operations, units, such as DAU 12 with its associated detector array 11, can be located at random throughout the area 14. They are then interrogated as to the seismic data in real time while concomitantly obtaining information as to range. Triangulation computations based upon the ranging data acquired through use of the slave station 15 provide locations in azimuth.

Figure 2:
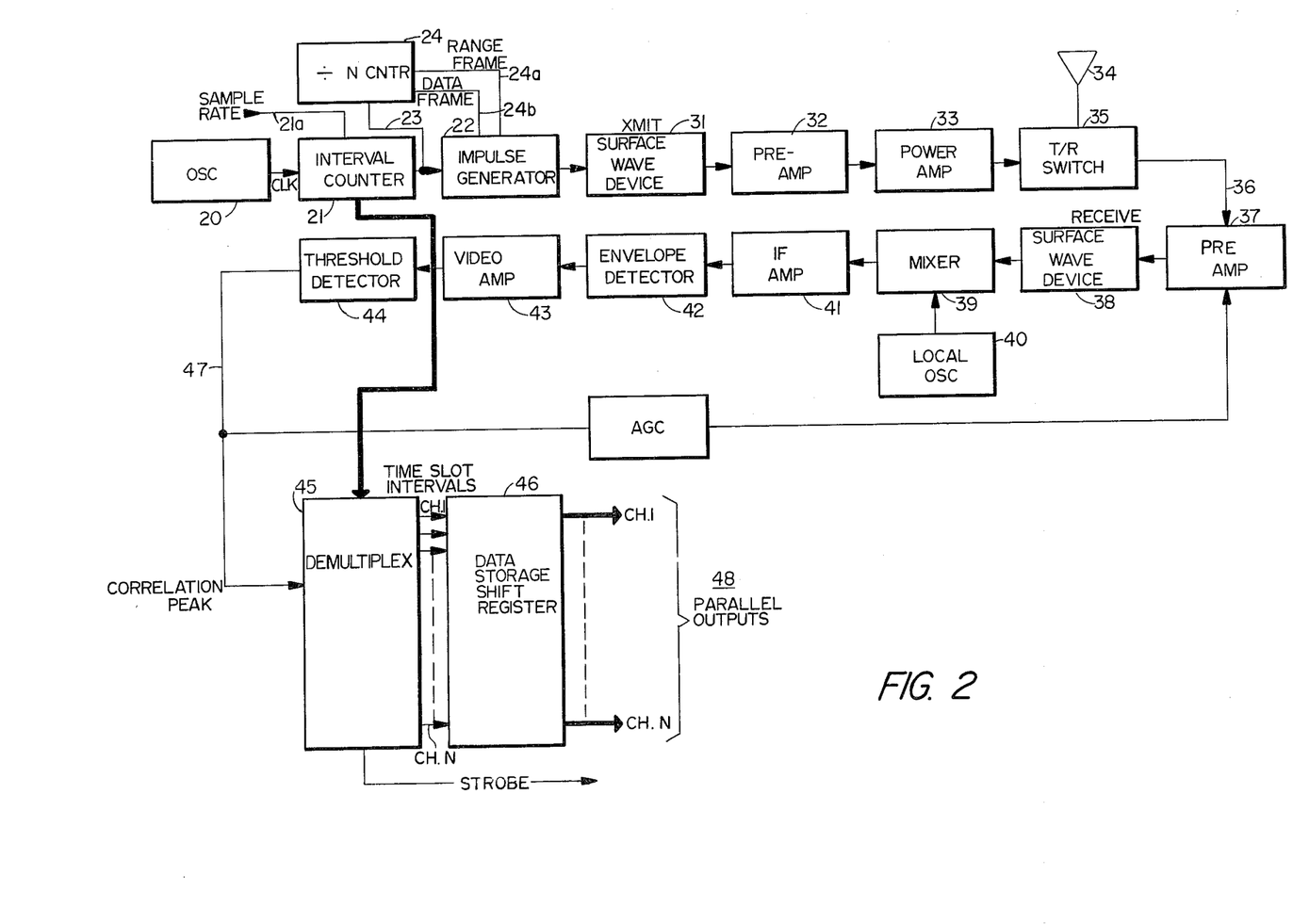
FIG. 2 is a block diagram of the master station 13 of FIG. 1.

FIG. 2 illustrates the master station 13 in block form. A clock oscillator 20 is connected to an interval counter 21. The interval counter 21 is provided with a control by way of line 21a to control the rate at which the seismic data is to be sampled. The output of interval counter 20 is connected to an impulse generator 22, and by way of line 23, to a divide-by-$n$ counter 24. The impulse generator 22 produces a radio frequency impulse of submicrosecond duration. The impulse is produced at a repetition rate determined by counter 21. The sequence of output pulses from generator 22 is illustrated in FIG. 3.

Figure 3:
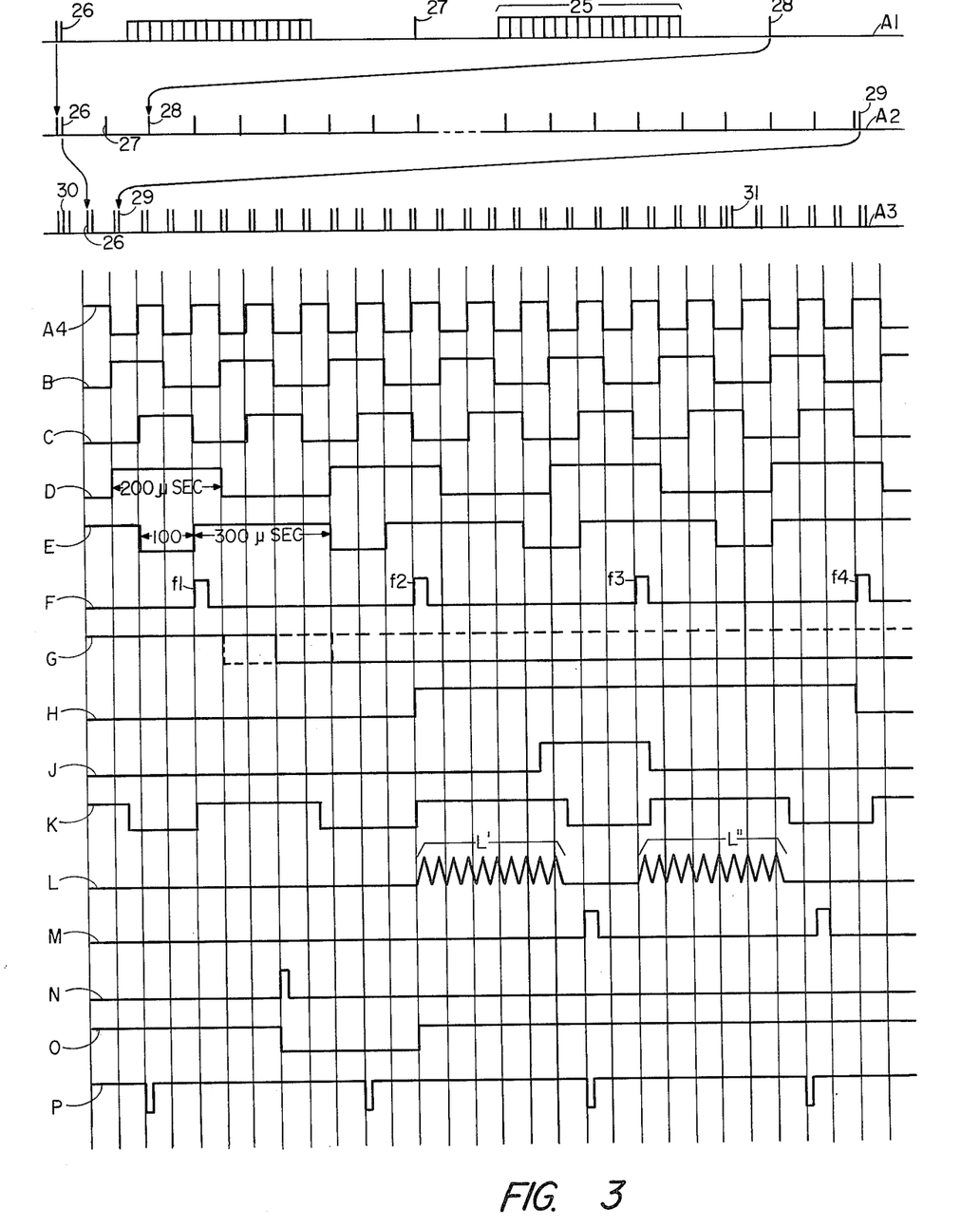
FIG. 3 is a timing diagram of the operations involved in the present invention.

In FIG. 3, waveform $A_1$ includes a representation of a block 25 of pulses which are to be transponded from a DAU. Sixteen bits of data information are to be transmitted by DAU 12 in response to a channel sync pulse 27. Pulse 27 is spaced a predetermined interval after a data frame pulse 26. Twenty-two further channel sync pulses, such as pulse 28, follow pulse 27 at uniform time intervals where twenty-four data acquisition units are employed. Twenty-four channel sync pulses are generated between data frame sequences.

Waveform $A_2$ illustrates a data frame pulse sequence 26, 29 with channel sync pulses 27, 28, 35c between data frame sequences 26 and 29.

The data frame pulse sequences 26 and 29 each comprises two pulses, one transmitted immediately after the other.

Waveform $A_3$ illustrates the train of pulses 26 . . . 29, etc. The data frame sequences follow a range cycle pulse sequence 30. There are twenty-four data frame sequences between range cycle pulse 30 and the next succeeding range cycle sequence 31. Range cycle sequences 30 and 31 each comprises a set of three successive impulses.

Returning now to FIG. 2, channel sync pulses, frame and range sequences are applied from impulse generator 22 to a surface wave device 31. The surface wave device 31 serves to spread each sub-microsecond impulse from generator 22 over a substantial band and to give the wave a unique character to be detected by a matching surface wave device at stations 10, 12, 15, etc. remote from the master station 13, FIG. 1. A preamplifier 32 and a power amplifier 33 then energize antenna 34 by way of a T/R switch 35. The system thus far described in FIG. 2 is a conventional RF channel except for the use of the surface wave device which provides for bandwidth expansion.

The system thus far described comprises the transmitter section of the master station.

The master station also is provided with a receiver section so that information contained in the pulse train 25, FIG. 3, can be received and stored at the master station. The receiver section includes line 36 leading from T/R switch 35 to a preamplifier 37. Preamplifier 37 is then connected to a receiving surface wave device 38 which is the same as device 31 but with the signal being applied to provide a mirror image treatment of the signals from the treatment in unit 32. The output of surface wave device 38 is then applied to a mixer 39 which is supplied by a local oscillator 40. The output of the mixer 39 is applied by way of IF amplifier 41 to an envelope detector 42 so that there will be produced at the output of envelope detector 42 a pulse of microsecond duration precisely at the center of the pulse output from the surface wave device 38. The output pulse from envelope detector 42 is then applied to a video amplifier 43 whose output passes by way of a threshold detector 44 to a demultiplexer 45 and thence to a data storage shift register 46. The seismic data signals which appear on output line 47 which leads to demultiplexer 45 appear on output lines 48.

There are many specific modes in which the data may be processed or employed once it is assembled in multiplex form on line 47. Thus, the present invention is directed to the acquisition in multiplexed form at the master station of the real time seismic data and range data.

Figures 4, 9:
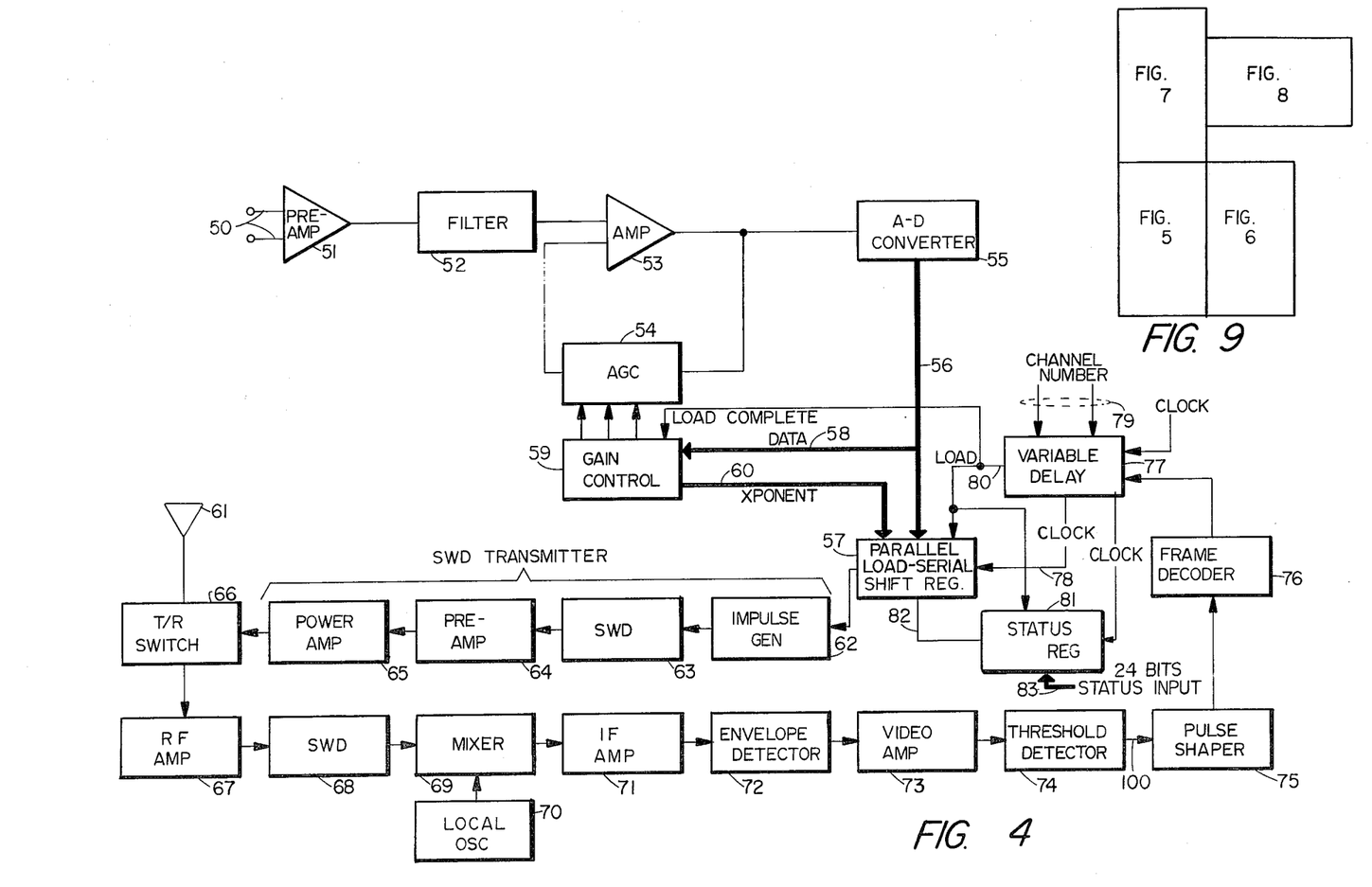
FIG. 4 is a block diagram of the DAU of FIG. 1.
FIG. 9 illustrates the positional relation between the four sheets of drawings on which FIGS. 5-8 appear.

FIG. 4 illustrates one embodiment of DAU 12. Seismic array 11 is to be connected to the input terminals 50 of a preamplifier 51 the output of which passes through a filter 52. The preamplifier 51 and filter 52 are conventional components currently used in seismic surveying system known as the DFS I — DFS IV manufactured, used and sold by Texas Instruments Incorporated of Dallas, Texas. Circuitry leading from filter 52 embodies components for the real time A/D conversion and transmission of the digital representation of 2 millisecond or 4 millisecond samples of the seismic signal applied to terminals 50 in response to interrogation pulses from the master station. More particularly, an amplifier 53 is provided with an automatic gain control circuit 54. The output of amplifier 53 is connected to an A/D converter 55, the output of which is applied by way of channel 56 to a parallel load serial shift register 57. Branch line 58 leads from line 56 to a gain control generator 59. Generator 59 serves to control the automatic gain control unit 54. Gain control unit 59 has an output line 60 which leads to the shift register 57. Thus, on line 56 the data in the form of a multibit word is stored in register 57 along with the gain exponent in the form of a multibit set applied by way of line 60. The content of the shift register 57 may then be clocked out to be transmitted from antenna 61. The channel between shift register 57 and antenna 61 includes an impulse generator 62 that produces a submicrosecond impulse for each binary "one" in shift register 57. The output of impulse generator 62 is applied to a surface wave device 63 whose output is in turn applied by way of preamplifier 64 and power amplifier 65 to a T/R switch 66. Impulse generator 62 produces an RF pulse of sub-microsecond duration which is applied to the surface wave device 63 to spread the pulse in time and spectrum, thus permitting encoding of a particular signature on the pulse while permitting relatively low power transmission per cycle of bandwidth.

The interrogation codes received by a DAU pass from antenna 61 by way of T/R switch 66 to an RF amplifier 67. The output of amplifier 67 is applied to a surface wave device 68 which is the same as device 63 but connected to provide time compression of the received signal. The output of surface wave device 68 is applied to a mixer 69 which is fed by a local oscillator 70 to convert the output of surface wave device 68 to an intermediate (IF) frequency. The output of mixer 69 is applied to an IF amplifier 71 and thence to an envelope detector 72 whose output is applied by way of a video amplifier 73 and a threshold detector 74 to a pulse shaper 75. The pulse shaper 75 feeds a frame decoder 76 which provides an input to a variable delay unit 77. Delay unit 77 provides clock pulses by way of line 78 to the register 57. Channel members are manually preset as by lines 79 to control the clock line 80 leading to the shift register 57. Clock pulses are also applied from unit 77 to a status register 81. The status register supplies an input to register 57 in the form of single bits in time sequence by way of line 82. The input to status register 81 is a bus 83 that provides capacity for twenty-four bits of status information relating to the data acquisition unit.

Each DAU shown in FIG. 1 will comprise the transponder indicated in FIG. 4 with the real time storage in shift register 57 of digital representations of the analog data appearing at terminals 50. Such stored data is then read out of shift register 57 and transmitted through antenna 61 from each DAU in response to interrogation pulses from the master station as decoded by the variable delay unit 77.

FIGS. 5-8 arranged as shown in FIG. 9 illustrate the major portions of the DAU.

Figure 5:
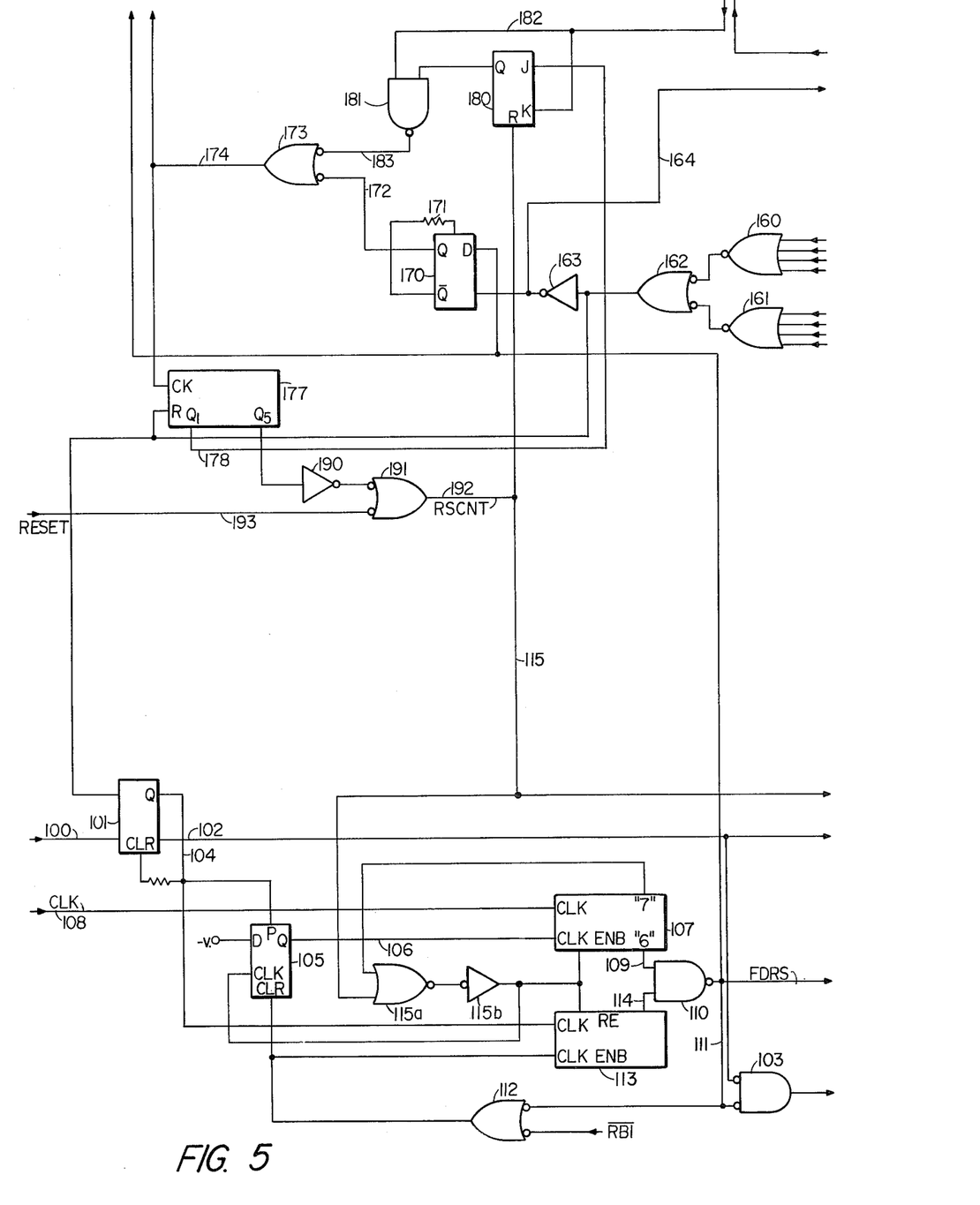
FIGS. 5 and 6 are a detailed circuit diagram of a control system of the DAU of FIG. 4.
Figure 6:
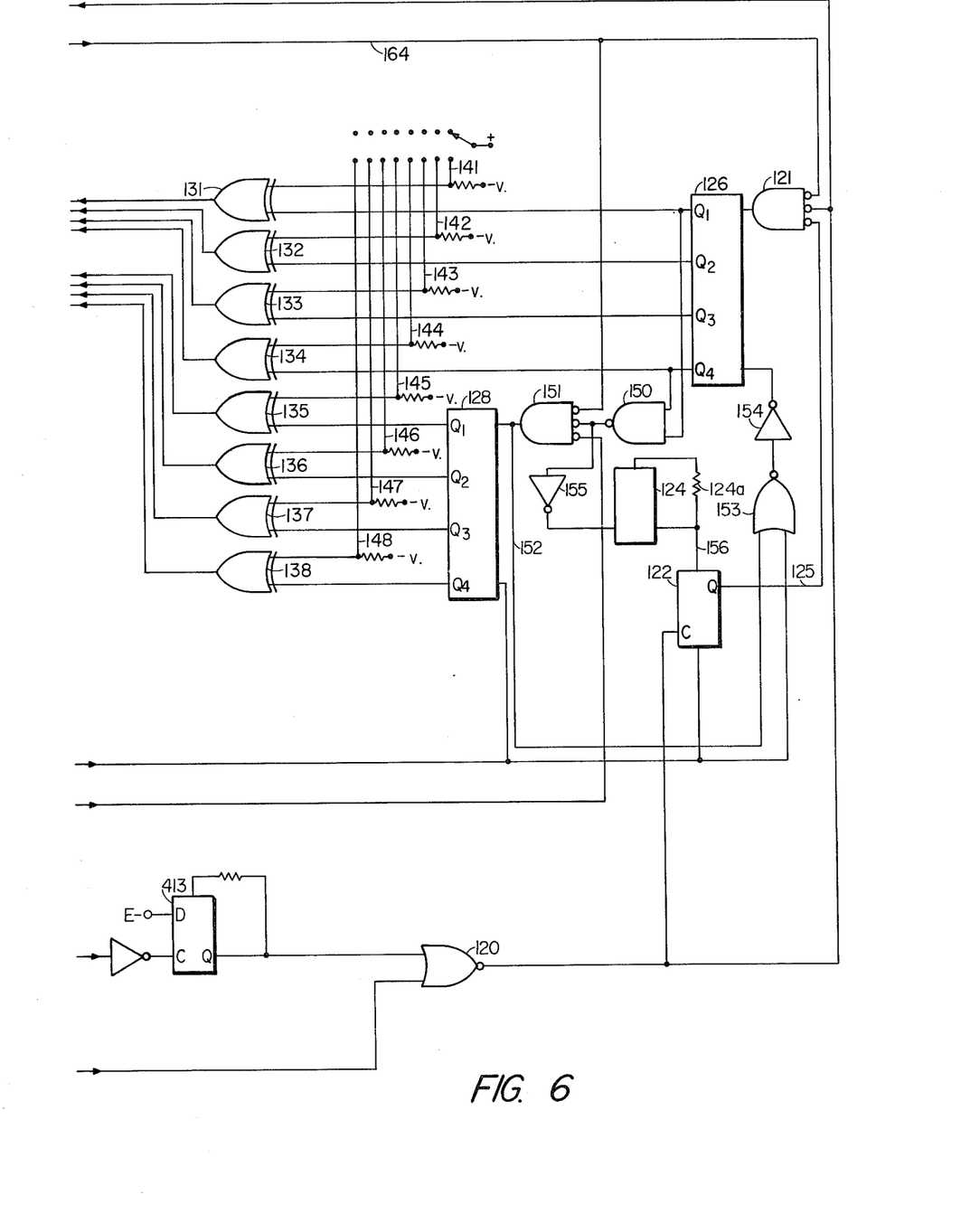

FIGS. 5 and 6 illustrate portions of the circuit of FIG. 4 including the pulse shaper 75, frame decoder 76 and the variable delay leading to the output line 80 of FIG. 4. The input line 100 of FIG. 5 is the input line leading to pulse shaper 75. The circuit shown in FIGS. 5 and 6 serves to receive interrogation pulses from the master station and cause the generation of control pulses which will read out of the shift register 57 data that is stored therein at the instant that the interrogation pulse is received by the data acquisition unit.

As shown in FIGS. 5 and 6, interrogation input line 100 leads from the radio receiver channel to the input of a flip-flop 101 used as a one-shot multivibrator for pulse shaping purposes. The output pulse from unit 101 appears on line 102 and is applied to one input of a NOR gate 103. Line 102 represents the output of unit 101 which is inverted from the input on line 100. Line 104 has an output the same polarity as on line 100. Line 104 is connected to the preset input of a flip-flop 105. The output of flip-flop 105 appears on line 106 which is connected to the clock enable input of a seven bit binary counter 107. The clock line 108 is the system clock operating at 2.560 megaHertz.

One of the lines, the line 109 leading from counter 107, is connected to one input of a NAND gate 110. The output of gate 110 is connected by way of line 111 to the second input of NOR gate 103. Line 111 is also connected through a NAND gate 112 to the clear input terminal of the flip-flop 105. The output of NAND gate 112 is also connected to the clock enable terminal of a counter 113. Output line 114 from counter 113 is connected to the second input of NAND gate 110. Line 104 is connected to the clock input of counter 113. Line 115 is connected through NOR gate 115$a$ and inverter 115$b$ to the enable input of decade counter 107 and to the reset input terminal of binary counter 113. The numerals 6 and 7 in counter 107 denote output pulses 6 and 7, respectively, of the five stage decade counter 107. Thus, either output pulse 7 or the line 115 can reset counters 107, 113 and flip-flop 105 through the NOR gate and inverter.

The output of NOR gate 103 is connected by way of NOR gate 120, FIG. 6, to the input of a three input NOR gate 121 and to the clock input of a flip-flop 122. Flip-flops 101, 105 and 122, as well as flip-flop 124, are D flip-flops. When a pulse appears at the output of gate 120, the leading edge of the pulse from gate 120 will make certain that the state on line 125 leading from the Q output of flip-flop 122 is low. Line 125 is connected to a second input of NOR gate 121. The third input is supplied from a circuit later to be described to indicate that an I.D. comparison is complete.

NOR gate 121 is connected to the clock input of a seven stage binary counter 126. Counter 126 along with counter 128, also a seven stage counter, are employed together with the associated circuitry to transform data at the output of gate 121 into binary-coded-decimal data as it is applied to a set of exclusive OR gates 131-138.

Exclusive gates 131-138 compare the binary coded decimal outputs of counters 126 and 128 with a preset digital input binary coded decimal I.D. code from thumb wheel encoders provided for manual input of the code in each DAU. Output states of the thumb wheel switches appear on lines 141-148. For this purpose, it will be noted that the bits of weights 1 from terminal $Q_1$ and 8 from terminal $Q_4$ from counter 126 are connected to OR gates 131 and 134 and are also connected to NAND gate 150. The output of NAND gate 150 is connected to one input of a three input NOR gate 151. The output of NOR gate 151 is connected to the clock input of counter 128 and, by way of line 152, to the input of a NOR gate 153. The output of NOR gate 153 is connected by way of an inverter 154 to the reset terminal of counter 126. The output of NAND gate 150 is connected by way of inverter 155 to the clock input of flip-flop 124. Flip-flop 124 is operated as a one shot the period of which is determined by resistor 124$a$. The Q output terminal of flip-flop 124 is connected by way of line 156 to the preset input terminal of flip-flop 122. The state on line 125 serves to inhibit any input to NOR gate 121 for one clock interval.

The output lines from the exclusive OR gates 131-138 are connected to inputs to NOR gates 160 and 161. The outputs of NOR gates 160 and 161 are connected to the inputs of a NAND gate 162. The output of NAND gate 162 will be low with the output of inverter 163 being high if, and only if, all of the input lines leading to gates 160 and 161 are low.

The output line 164 from inverter 163 is connected to the third input line to each of the NOR gates 121 and 151. This serves to stop counting in the units 126 and 128 when the state on the output of inverter 163 is high or true.

Inverter 163 is also connected to the clock input of a flip-flop 170 which is operated as a one shot, with a period of 1 millisecond which is determined by the resistor 161. Line 172 is connected from the Q output of flip-flop 170 to an input of a NAND gate 173. Output line 174 is connected to the clock input terminals of two register modules 175 and 176, FIG. 7, which form the shift register 57. Modules 175 and 176 are each eight-input parallel-load serial shift registers. Line 174 is also connected to the clock input terminal of a seven bit counter 177. The circuit operates such that when the output of inverter 163 is high or true, a true pulse having a period determined by one shot 170 appears on line 174.

The trailing edge of each pulse on line 174 is effective in counter 177 to cause the output $Q_1$ appearing on line 178 to go true. Line 178 is connected to the J input terminal of a J-K flip-flop 180. Such pulse causes flip-flop 180 to change state. The Q output of the flip-flop 180 is connected by way of NAND gate 181 and line 183 to the second input terminal of the NAND gate 173. This enables the clock pulses appearing on line 182 to be transmitted through line 183 to the NAND gate 173 and line 174 for application to shift register 57, FIG. 7, as well as to counter 177. An inverter 190 is connected to the $Q_5$ output terminal of counter 177. Inverter 190 is connected to a NAND gate 191. The output of NAND gate 191 appears on line 192.

Figure 7:
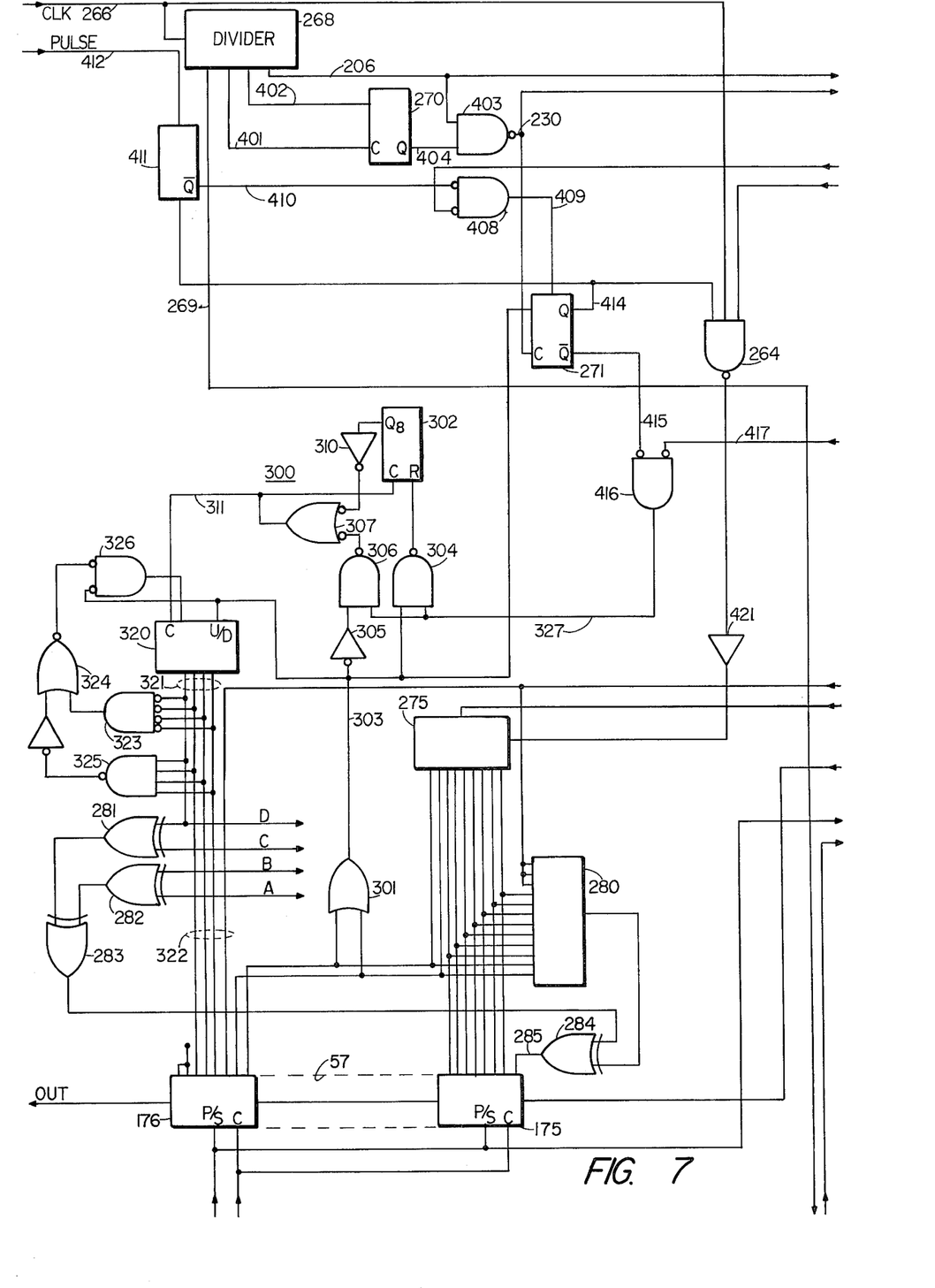
FIGS. 7 and 8 illustrate in detail the amplifier converter and shift register of FIG. 4 together with associated control circuits.

Output line 192 is a reset line leading to the reset terminals of counters 107 and 113, to the reset terminal of counter 128, to the reset terminal of flip-flop 122 and to the second input of NOR gate 153. Line 192 is also connected to the reset terminal of flip-flop 180. The output of NAND gate 162 is connected by line 194 to the reset terminal of counter 177 to reset the same and to flip-flop 101.

An initial reset line 193 is connected to the second input of NAND gate 191.

Figure 8:
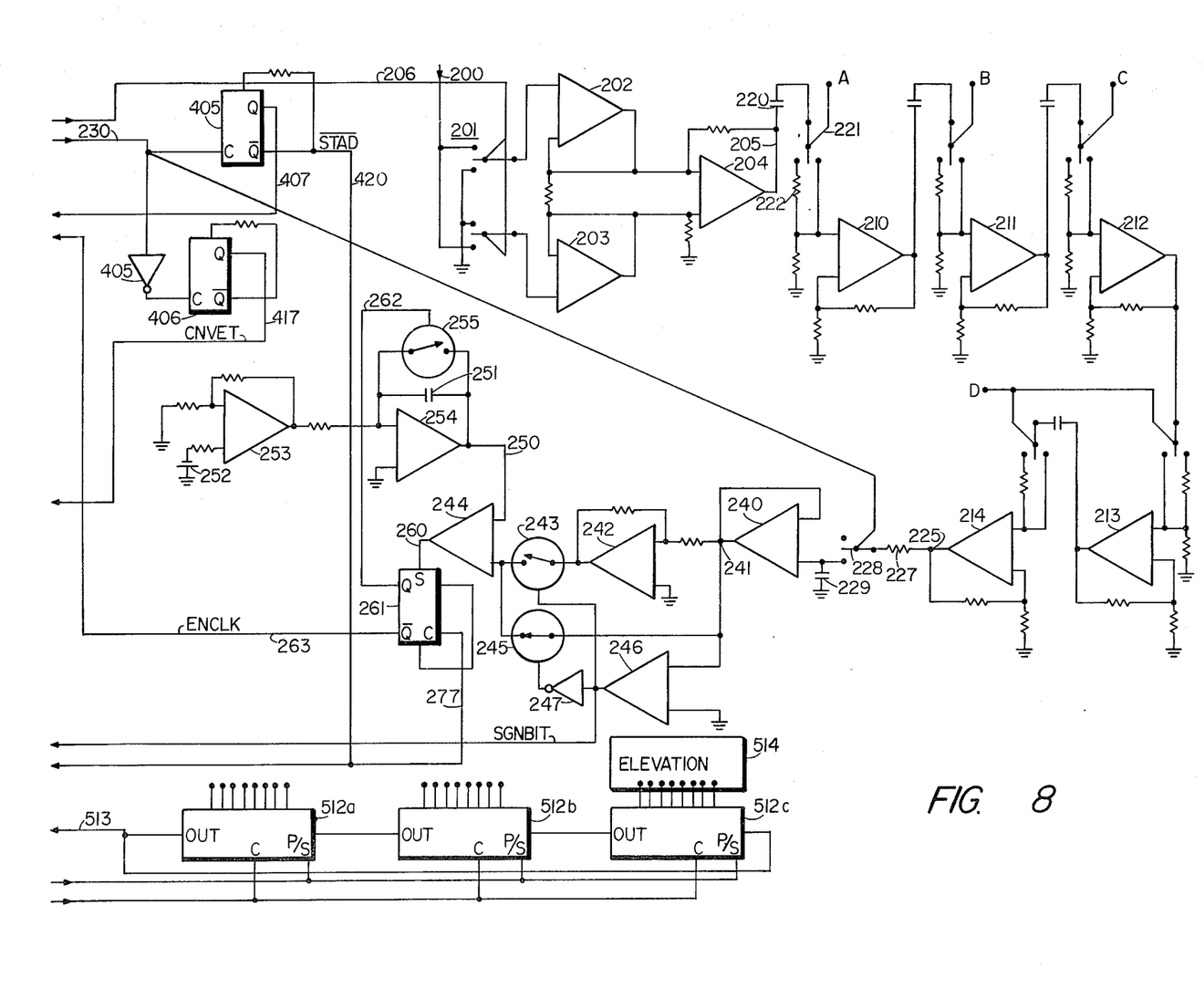

The seismic data from a sensor-filter channel leading from a seismic detector array appears on line 200, FIG. 8. Line 200 is connected by way of a chopper 201 to the inputs to two amplifier modules 202 and 203. Amplifier modules 202 and 203 are fed at their output to the input of a summing amplifier 204. The chopper 201 and modules 202-204 work together to provide a square wave output for a DC input. The operation is such that if a DC voltage of 5 volts appears on line 200, at point 205 a square wave output is produced which ranges between +5 volts and −5 volts. The waveform is symmetrical about the ground or zero potential point. The seismic data sample rate is high so that for each sample the input appears to be DC and is chopped to produce the sample signal.

Chopper 201 is operated from a line 206 which is at the frequency at which the signal on line 200 is to be sampled. Normally the sample rate will be either 2 milliseconds or 4 milliseconds. A 2 millisecond sample rate will be employed in the example here given.

The output appearing at point 205 is then passed through effectively four stages of gain control. The first stage comprises a module 210, the second stage is module 211, the third stage is module 212. Modules 213 and 214 cooperate together to form the fourth gain control stage.

The gain control stages are coupled as by capacitors 220. The output of capacitor 220 goes to the arm of a gain control switch 221. One switch terminal is connected directly to the input of module 210. The other terminal is connected to the input by way of a voltage dropping network including resistor 222.

The amplifier module 210 and the elements connected thereto are so chosen that in one position of switch 221 the amplifier will have a gain of $2^0$ or a gain of unity. In the other position of the switch 221, the amplifier stage will have a gain of $2^1$ or a gain of two.

The stage involving module 211 is provided with components connected thereto as to have a gain of either $2^0$ or $2^2$, i.e., unity or a gain of four. The stage involving module 212 is provided with components to have a gain of $2^0$ or $2^4$, i.e., unity or a gain of sixteen. The stage involving modules 213 and 214 is provided with components as to have a gain of $2^0$ or $2^8$, i.e., unity of two hundred fifty-six.

By selecting combinations of switch positions, such as switch 221, the system between the output of condenser 220 and the output terminal 225 may be selectively controlled to have a gain at any power of two between $2^0$ and $2^{15}$. This gain can be selected by applying control states to the four input terminals A, B, C, D.

The output of the variable gain amplifier is then applied by way of a damping resistor 227 to a sample and hold switch 228. When the switch 228 is connected to capacitor 229, capacitor 229 will be charged such that the voltage thereacross follows the applied voltage. At the instant switch 228 is opened by enabling line 230, the voltage on capacitor 229 is fixed and is applied to the input of an amplifier 240. Amplifier 240, connected at its input across capacitor 229, is a high impedance amplifier. It serves to provide a unity gain output at terminal 241 without draining the charge from condenser 229.

The voltage at terminal 241 is then applied to unity gain amplifiers 242 and 246. The output of amplifier 242 may pass by way of a switch 243 to the signal input terminal of an analog comparator 244. The output of amplifier 240 may also pass to comparator 244 by way of switch 245.

Amplifier 246 provides comparator control. It is connected at its positive input to terminal 241 and at its negative input terminal to ground which serves as a reference point for the operation of the amplifier 246. If the output of amplifier 240 is positive, switch 243 is turned on by amplifier 246 so that the comparison voltage applied to amplifier 244 is the voltage output of amplifier 242, i.e., the inverse of the voltage at terminal 241 since amplifier 242 has a gain value of −1.

If the voltage at terminal 241 is negative, then the output of control amplifier 246 is applied by way of inverter 247 to switch 245 to turn it on. In this case the voltage applied to the comparator 244 is the voltage at terminal 241.

The comparator 244 is supplied by input line 250 with a linear ramp voltage which reoccurs cyclically and at a ramp repetition rate which is dependent upon the rate at which the signal applied to line 200 is changing. The manner in which the repetition rate of the ramp voltage is controlled will be hereinafter explained.

The voltage on line 250 is a voltage which is developed across condenser 251 derived from a DC reference voltage cell 252. Cell 252 is connected by way of amplifier 253 to the input of a ramp generator module 254. The module 254, capacitor 251 and a control switch 255 form an integrator. With switch 255 turned on, the voltage on capacitor 251 is short circuited to discharge capacitor 251. When switch 255 is open, current is fed onto condenser 251 at a constant rate from module 254, thus causing a voltage ramp going in a direction from positive towards negative to appear on line 250. It is this voltage that is compared in comparator 244 with the voltage from terminal 241.

The output of comparator 244 is connected by way of line 260 to a D type flip-flop 261. The Q output of flip-flop 261 is connected by line 262 to switch 255. The Q output is connected by way of line 263 to one input of a NAND gate 264. The second input of NAND gate 264 is fed by way of a clock line 266 to apply clock pulses to a counter 275 during the interval that the reference voltage on line 250 is less than the voltage from switches 243 or 245. The contents of counter 275 then represent the digital conversion of the sampling of the seismic analog voltage on line 200 at the sample instant.

The analog voltage appearing at line 200 is thus converted to a nine bit digital representation plus a sign bit. This digital representation is stored in registers 175 and 176 (FIG. 7). To accomplish this conversion, counter 275 is turned on when the Q output appearing on line 263 of flip-flop 261 goes high. This enables passage of the clock pulses on line 266 to pass through NAND gate 264 and then, by way of line 277, to the clock input of the counter 275. Counter 275 terminates counting the applied clock pulses when flip-flop 261 reverses its state. The time interval that counter 275 counts is then dependent upon the instantaneous amplitude of the analog signal from line 200 as sampled and held on condenser 229.

Counter 275 is reset by control pulses on line 277 which occur at the seismic signal conversion rate.

The contents of counter 275 is loaded into shift registers 175 and 176 in response to a control state on line 111 leading from NAND gate 110 of FIG. 5.

Registers 175 and 176 are each eight bit registers.

The first two bits of register 176 are connected to a positive voltage, i.e., always a one (1) state. The transmission of the first bit (range bit) from the data acquisition unit to a control station will always provide a basis at the central station for measurement of the range of or distance from the data acquisition unit relative to the central station. The second bit (sync bit) is used to synchronize the "master" decoder to recover transmitted data.

Bits 3-5 of register 176 are gain exponent bits. Bits 6-8 of register 176 and bits 1-7 of register 175 are the outputs from counter 275. Bit 8 of register 175 is a parity bit. Input line 513 to register 175 provides a status bit. The 24 bit status word is transmitted by encoding one bit in time sequence with each data word.

Unit 280 is a logic tree connected to the output lines from counter 275. Unit 280 together with logic units 281, 282, 283 and 284 serve to provide a parity bit of 1 on output line 285 if there is an even number of 1's in all of the interior bits between the input line 285 to register 175 and the range bit on register 176. The gain control states on lines A-D are generated by a gain control circuit 300, FIG. 7. This circuit senses through NOR gate 301 the states of the two most significant bits of the digital data in counter 275. The two bits are sensed and if either is a binary "one", then the circuit 300 will operate to reduce the gain. Zeros on both of the inputs to NOR gate 301 indicate that the signal level applied to the controlled gain amplifier section 210-214 is less than quarter scale of the analog signal range that the amplifier can accommodate. The object of a circuit 300 is to adjust the gain of the amplifiers 210-214 so that the signal level is at a point slightly below the quarter range point. Circuit 300 operates to permit rapid compression of the gain but a controlled longer period increase in gain. This is done by employing a counter 302. Counter 302 is connected from NOR gate 301 by way of a line 303 leading to one input of a NAND gate 304. Line 303 is connected by way of an inverter 305 and NAND gate 306 to an input of a NAND gate 307. The output of NAND gate 307 is connected to the clock input of counter 302. The output of NAND gate 304 is connected to the reset input of counter 302. The second input of NAND gate 307 is connected from the $Q_8$ output terminal of counter 302 by way of an inverter 310. The output of NAND gate 307 is also connected by way of line 311 to the clock input of an up/down counter 320. Line 303 from NOR gate 301 is connected to the up/down (directional) control terminal of counter 320. The four output lines 321 from counter 320 are selectively connected to logic units 281 and 282 of the parity generator. Lines 322 representing the three least significant bits of counter 320 are connected to the three gain bit terminals of shift register 176 for transmission along with the seismic data digital code from the DAU to a master station.

A NOR gate 323 is connected to all four of the output lines 321 and thence to one input of a NOR gate 324. The second input of NOR gate 324 is supplied by the output of a NAND gate 325 connected at its input to the four lines 321 and at its output through an inverter. The output of NOR gate 324 is connected to one input of a NOR gate 326 the output of which is connected to the enable input terminal of counter 320. The second input of NOR gate 326 is connected to line 303 in common with the second input of each of the NAND gate 304 and inverter 305. The second input to gates 304 and 306 is supplied by way of control line 327. Control line 327 leads from a sequencer unit to be described.

Lines 321 are common to the gain control lines A-D, respectively, extending to the gain control input terminals of the amplifier section 210-214.

The line 303 from NAND gate 301 leading to the up/down terminal of counter 320 determines whether or not the counter will count up or down. If the signal on line 303 is low, pulses on control line 327 are routed directly through gates 306 and 307 and line 311 to the clock input of counter 320. If the signal on line 303 is high, then control pulses on line 327 are routed through NAND gate 304 to the counter 302. Counter 302 will then provide an output which passes through gate 307 to the clock input line 311 of counter 320. An output pulse from counter 302 occurs only after a preset number of counts in counter 302 has been achieved, i.e., it operates as a divider. Counter 302 in one embodiment of the invention was a counter which would provide an output on the basis of one out of 128 input pulses, i.e., it was a divide by 128 counter. This counter, therefore, determines the ratio between the gain compression rate and the gain expansion rate. The gain compression rate can be substantially instantaneous. The gain expansion rate is 1/128th of the compression rate. In a typical installation, the compression rate was of the order of 24,000 db per second and the expansion rate was of the order of 186 db per second.

The sequencing circuit for control of the system thus far described involves clock pulses appearing on line 266. The clock pulse input is at a frequency in the present example of 2.560 mHz preferably derived from an accurately controlled crystal oscillator.

Line 266 is connected to the clock input of the divider 268 which was a twelve bit binary divider. Line 266 is also connected into one input of the NAND gate 264.

Divider 268 provides outputs, four of which are utilized in the present sequencer. The first output appears on line 269 and is at a frequency of 160 kHz. The second output appears on line 401 and is at a frequency of 10 kHz. A third output appears on line 402 and is at a frequency of 5 kHz. The fourth line 206 is at a frequency of 2.5 kHz. As above noted, line 206 leads to the control input to the chopper 201. Thus, the voltage on the signal line 200 is sampled every 400 microseconds. Line 206 is also connected to one input of a NAND gate 403. The second input of NAND gate 403 is connected from flip-flop 270 by line 404. The 10 kHz and 5 kHz lines 401 and 402, respectively, are connected to the clock and the D inputs of flip-flop 270, thus supplying on line 404 a pulse series that is out of phase with the 5 kHz signal on line 402 but of the same length and repetition rate.

The output of NAND gate 403 is connected by way of sample and hold control line 230 to the clock input of a D flip-flop which is operated as a monostable multivibrator 405. Line 230 is also connected to the control terminal of switch 228 in the sample and hold circuit. It is also connected to the clock input of flip-flop 271. Finally it is connected by way of an inverter to the clock input of a flip-flop 406 operated as a monostable multivibrator.

The Q output of flip-flop 405 is connected by way of line 407 to one input of a NOR gate 408. The output of NOR gate 408 is connected by way of line 409 to the preset input terminal of flip-flop 271. The second input of NOR gate 408 is supplied by way of line 410 from the Q output of a flip-flop 411. A line 412 leads to the present input terminal of flip-flop 411 and is connected by way of line 412 to the Q output of a flip-flop 413. The flip-flop 271 is connected from the Q output thereof by way of line 414 to a second input of the NOR gate 264.

The Q output terminal of flip-flop 271 is connected by way of line 415 to one input of a NOR gate 416. The second input of NOR gate 416 is supplied by way of line 417 from a Q output of flip-flop 406.

The third input to NOR gate 264 is supplied by way of line 263 from the Q output terminal of flip-flop 261. Line 420 leading from the Q output terminal of flip-flop 415 is connected to the clock input of flip-flop 261 and to the reset terminal of counter 275.

OPERATION - FIGS. 5-8

The operation of the sequencing circuit can best be understood by now referring to the timing diagram of FIG. 3.

Waveform $A_1$ represents channel sync pulses transmitted within each data sample interval. Thus, channel sync pulses would be repeated at the rate of either 80 microseconds for a 2 millisecond sample rate or every 160 microseconds for a 4 millisecond sample rate. For a 24 channel system, in the interval between each pair of channel sync pulses, the channel addressed will transpond with the 17 bit word 25 represented by the data stored in shift registers 175 and 176.

Waveform $A_2$ represents a complete channel scan cycle where each 25th channel sync pulse comprises two pulse sets 26 and 29. The two pulse transmission is a data frame sync. In each data frame as between pulses 26 and 29, twenty-five channels are sampled, i.e., the 24 channels of seismic data are sampled and a slave station is sampled for data representing the range between the master, the slave, and one data acquisition unit.

Waveform $A_3$ represents on a compressed time scale three pulse sets transmitted every 25th data frame. This provides for range synchronization. That is, for each data frame only one range word can be acquired for one DAU. Therefore, to acquire all range data for all twenty-four DAUs, twenty-four data frames are necessary. The range tracking sequence is employed to synchronize the range data.

In FIG. 3, the pulse waveform $A_4$ represents a square wave 10 kHz clock pulse appearing on line 401, FIG. 7. Pulse waveform B represents the 5 kHz square wave pulse wave pulse series appearing on line 402, FIG. 7. The waveform C illustrates the Q output of flip-flop 270 appearing on line 404. The pulse waveform D is the control voltage which appears on line 206 at 2.5 kHz and is applied to the chopper 201.

The pulse waveform E in this example is high for 300 microseconds, followed by a 100 microsecond low. The pulse waveform E represents the sample and hold control voltage appearing on line 230, FIGS. 7 and 8, at the output of NAND gate 403.

The pulse waveform F preferably comprises pulses of the order of about one microsecond in length generated immediately following the end of each 100 microseconds low on waveform E. This pulse series appears at the Q output of flip-flop 404 and serves to reset the A/D conversion line 263 to cause line 263 to go high. When line 263 is high and when line 414 is high, then the 2.560 mHz clock pulses on line 266 will pass through NAND gate 264 and through inverter 412 to the clock input terminal of the counter 275. Line 277 is connected to the reset input terminal of the counter 275 to reset it just as the NAND gate 264 is enabled, thereby to begin a new series of pulses to the counter 275.

It will be noted that the operations depicted by the voltage waveforms A-F, in the embodiment here described, are free running.

Waveform G illustrates the voltage at the output of NAND gate 110, FIG. 5. When this voltage goes low, it signifies that the circuitry leading from input line 100 has received and identified a sync pulse set from the master station. It will be noted that the output of NAND gate 110 is connected to the clock input of the flip-flop 413. The output of flip-flop 413 is then connected by way of line 412 to the input of flip-flop 411. It is the pulse on line 412 represented by waveform N that initiates the synchronization for freezing the A/D conversion and storing the result in the registers 175 and 176. Thus, with the reception of the waveform G, the free running system illustrated by waveforms A-F is then keyed to the transmission from the master station. The clock control waveform H normally is low and goes high once every two milliseconds conicident with the waveform F (pulses $f_1, f_2, f_3, f_4, \ldots$) and the sync control waveform O, i.e., when the waveform O is low. Waveform O is developed from the pulse waveform N and appears on line 410. The waveform H appears at the output of flip-flop 271 and is set high by the voltage on line 409.

Waveform H stays high for a period of time which is variable depending upon the gain range. More particularly, waveform H stays high until the two inputs to the NOR gate 301 are both zero.

Waveform J represents the voltage on line 422 which leads from the output of inverter 305. If the waveform J from inverter 305 is high at the instant the waveform E goes high, then waveform I will remain high. However, if the condition exists as shown for pulse $f_4$ of waveform F where the waveform J is low, then waveform I is terminated as at the step $i_2$. The transition to a low state of the waveform I signifies that the gain ranging operations are completed and that the amplitude of the seismic signal applied by line 200 is less than quarter scale of the gain controlled amplifier.

The waveform K represents the voltage on line 263. This is a free running output. The length of the positive pulse on waveform K represents the time that the voltage on condenser 251 exceeds the signal voltage on sample and hold condenser 229.

waveform L represents the output of NAND gate 264 which is actually applied to counter 275 during the interval the waveform K is high. It will be noted that there are two groups L' and L" illustrated in FIG. 9. With the circuit shown in FIGS. 5-8, there may be as many as four such groups of clock pulses L', L" applied to counter 275. The A/D conversion will be repeated up to four repetitions so long as the gain ranging operation is not complete, i.e., until the two inputs to the NOR gate 301 are both zero.

Waveform M represents the voltage on line 327 leading from NOR gate 416. The pulses $m_1$ and $m_2$ are applied to the up/down counter 320 and are used in the gain ranging as above described.

The waveform M has been described above as has the waveform O.

Waveform P represents the voltage on line 417 leading from flip-flop 406 and is employed to develop the waveform M. Waveform P is free running.

The analog section of the circuit of FIGS. 5-8, particularly the chopper and the gain control amplifier, have circuit elements that operate between $-V$, ground, and $+V$. The logic diagram in the sequencer and the interrogation portions of the system operate only between $-V$ and $+V$ and do not have ground as a reference.

FIG. 10

Figure 10:
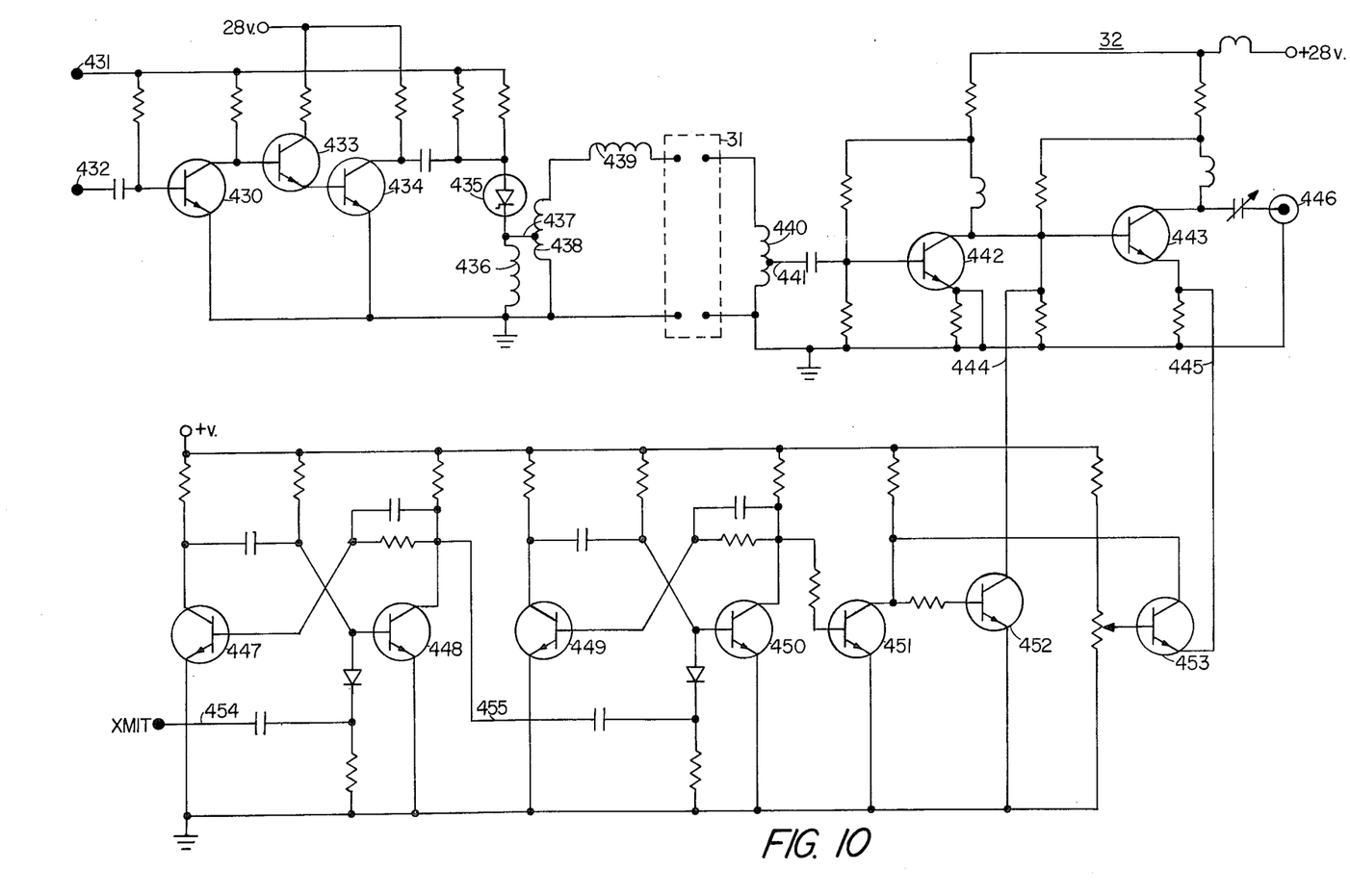
FIG. 10 is a detailed circuit diagram of an impulse generator and preamplifier blanking circuit suitable for driving a surface wave device in the present invention.

FIG. 10 illustrates a circuit for the surface wave devices (SWD) employed in FIGS. 2 and 4. The circuit employed with the SWD 31, FIG. 2, will be described. The circuit shown in FIG. 10 comprises the impulse generator 22 in which a switching transistor 430 is connected to be responsive to an enable state applied to terminal 431 when a transmit pulse is applied to the gate terminal 432. Transistors 433 and 434 serve to apply the pulse thus generated to a step recovery diodde 435 and thence to an inductor 436. Each output pulse applied to terminal 432 causes current to build in inductor 436 until the step recovery diode turns off. The resulting inductive kick is then applied by way of conductor 437 to the input matching circuit of the surface wave device 31. The input matching circuit includes an auto transformer 438 and a series inductor 439 which leads to the terminals of SWD 31. The output terminals of the SWD 31 lead through auto transformer 440 to the input terminal 441 of a preamplifier.

When diode 435 turns off the current, the resulting inductive kick applied to SWD 31 causes the matching network including auto transformer 438 and inductor 439 and the SWD components to ring, thereby applying several cycles of radio frequency output to terminal 441. In the embodiment of the invention here described, SWD 31 and its associated circuits are tuned to cause the system to ring at a frequency of 168 mHz, thus applying several cycles on input line 441. The SWD 31 preferably is a 100 bit phase-shift keyed sixteen cycle per bit matched filter with a center frequency of 168 mHz. The general arrangement construction of such devices is well known. SWD 31 consisted of three matched transducers made by depositing aluminum electrodes in interdigital patterns on the surface of the quartz bar. T and R input transducers at the ends of the bar were of an eight finger pair (15 interaction) pattern. A large output center transducer on the bar consisted of 100 groups of two finger-pair (3 interaction) pattern connected in parallel by long bonding pads along the opposite sides of the quartz bar. The spacing between groups was made equal to the distance traveled by an acoustic wave in the quartz bar in a one bit period.

In such a system the input and output to SWD 31 were matched to 50 ohms by means of the auto transformers 438 and 440. SWD 31, mounted and bonded, had an impedance of 2 k ohms in parallel with 3 picofarads capacitance for the T and R transducers and 258 ohms in parallel with 43.5 picofarads for the output transducer. The inductance 439 necessary to resonate it to 3 picofarads at 168 mHz was 270 nanohenrys. The inductance in unit 440 necessary to resonate 43.5 picofarads was 20.4 nanohenrys.

Preamplifier 32 leading from input terminal 441 is a two-stage amplifier to raise the spread spectrum signal produced by the SWD 31 from a level of $-34$ dBm to about 0.0 dBm. Amplifier 32 comprises transistors 442 and 443. Two blanking lines 444 and 445 are connected in the circuit of transistor 443 so that the output transistor 443 may be inhibited from operating except during desired SWD 31 outputs. This blanking also inhibits transmitter oscillatio which could injure the amplifier circuits connected to the output terminal 446.

Preferably when the SWD 31 is pulsed, only one of three resultant products will appear at the output terminal 441. The three products include a desired spectrum signal, cross feed from the input pulse which precedes the desired output, and a signal produced by the reflection of the acoustic wave from the end of the bar which follows the desired signal. The blanking circuit permits only the desired signal to pass through the preamplifier 32. Thus, blanking output line 444 may short circuit the base of preamplifier output transistor 443 to ground. The voltage on line 445 maintains the proper emitter bias on the inhibited transistor 443 so that it may be turned on again quickly.

The circuit including transistors 447-453 serve to provide the blanking control pulses to terminals 444 and 445. The input is derived from terminal 432 by way of line 454. Transistors 447 and 448 comprise a monostable multivibrator which feeds a like circuit by way of line 455. The output of the second multivibrator is applied to the base of transistor 451 which serves to feed blanking line 444 by way of transistor 452 and to feed blanking line 455 by way of transistor 453. Transistor 443 is turned on about one microsecond after the transmit pulse appears on the line 454. It is turned off a time interval thereafter depending upon the time constants of the circuit comprising the two multivibrators. During the interval the transistor 443 is turned off, the voltage state on the line 445 controls the bias on transistor 443 to permit it readily to be turned on again.

The power amplifiers 33, FIG. 2, were two units, the first, and 0.8 watt power amplifier followed by a 32 watt power amplifier. The radio frequency amplifier 33, the T/R switch 34 and the antenna 35 were built according to well known RF design and construction principles.

The surface wave device 38 used in the receiver section of FIG. 2 is identical to device 31 in the transmitter portion. Input and output ports of SWD 38 are matched to the RF amplifier output and to the input of converter 39. In this embodiment, the oscillator 40 had an output of 92 mHz to produce an output at the converter at 76 mHz which was then passed to an IF amplifier 41 and thence to an envelope detector 42.

Referring again to FIG. 2, pulses on sample rate line 21a produce output pulses through interval counter 21 which are applied to impulse generator 22 every 2 milliseconds. The same pulses are applied by line 23 to counter 24 which provides data frame pulses by way of line 24a at 1/24 the rate on line 23. The counter 24 also provides range data pulses on line 24b at 1/24 the rate on line 23. The counter 24 also provides range data pulses on line 24b at 1/24 the rate of the pulses on line 24a. In response to each data frame pulse on line 24b, the impulse generator 22 applies two pulses, such as pulses 26, FIG. 3, to the surface wave device 31. In response to each pulse on line 24a, generator 22 applies three pulses 30, FIG. 3, to surface wave device 31. The pulse applied to the surface wave device 31 preferably is a nanosecond pulse, of the order of 0.1 microsecond in length and of square wave envelope relative to an oscillation at 168 mHz. The output pulse from the surface wave device 31 is then of bandwidth of the order of 10 megacycles wide and 5 microseconds in length.

The two members of pulse 26 and the three members of pulse 30, FIG. 3, will have spacings of the order of 10 microseconds between centers thereof.

FIG. 11

Figure 11:
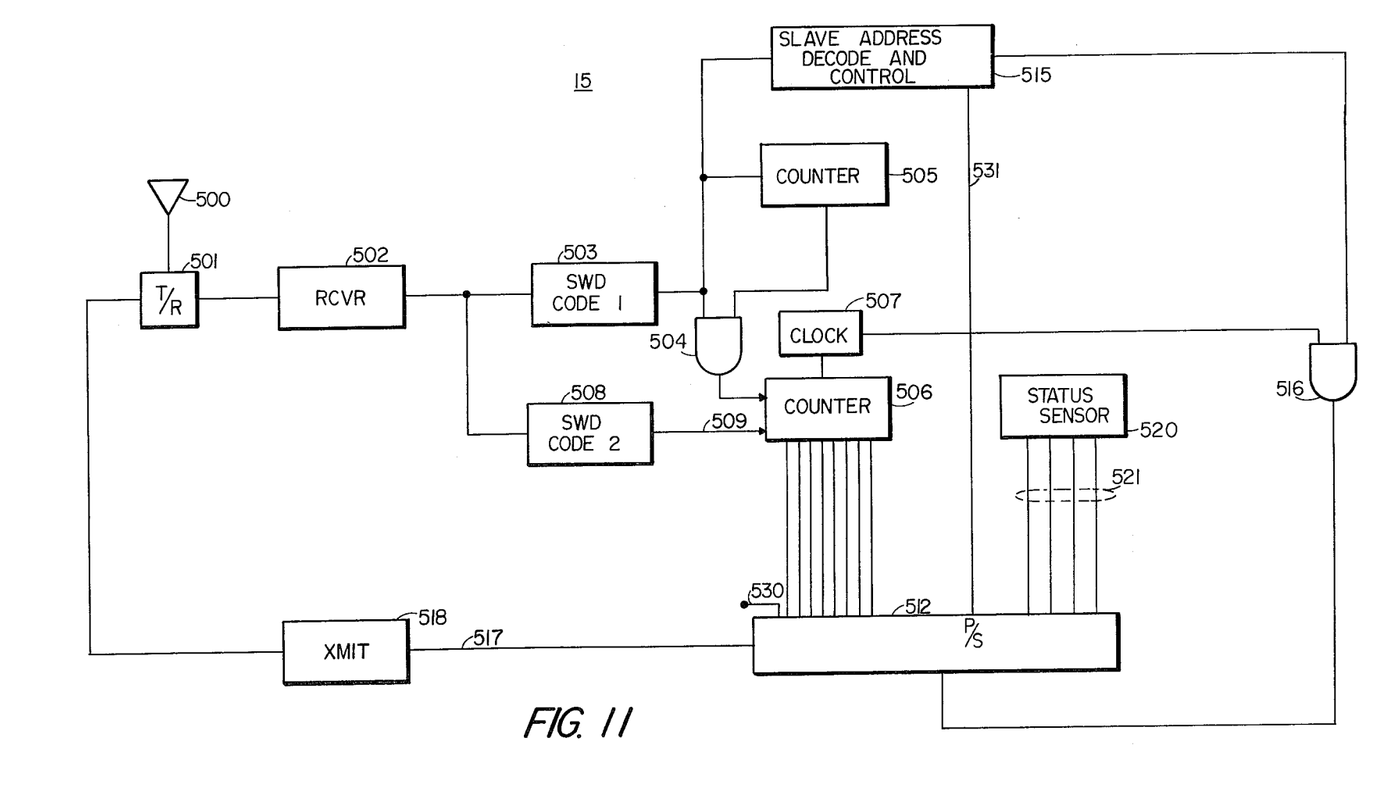
FIG. 11 illustrates an installation at the slave station 15 of FIG. 1.

Referring now to FIG. 11, the slave station 15 has been illustrated as comprising an antenna 500 which is connected by way of a T/R switch 501 and a receiver unit 502 to a first surface wave device 503. Surface wave device 503 is coded as to have the same code as the surface wave device 68 of FIG. 4 in the DAU receiver system. The output of surface wave device 503 is connected to an AND gate 504 and to a counter 505. Upon coincidence of a predetermined preset count in counter 505 of pulses from SWD 503, the AND gate 504 will initiate operation of a counter 506 which is supplied with clock pulses from a unit 507. The output of receiver 502 is also connected to a second surface wave device 508. Device 508 has the same code therein as the surface wave device 38 of FIG. 2. That is, surface wave device 503 has code 1 therein. Surface wave device 508 has code 2 therein. Thus, the slave station receives and applies to counter 506 a pulse over line 509 to stop counter 506 upon receipt of transmission from a DAU next following the transmission from the master station which starts counter 506. Thus, there is captured in counter 506 a count representing the time difference of transit between path 16 plus path 17, and path 18, FIG. 1, plus time constants represented by the response time of a DAU.

The count stored in counter 506 is then transferred to a status shift register 512 by way of a load command on line 531. Surface wave device 503 is also connected to a slave address decode and control unit 515 which is connected along with the output of clock 507 through AND gate 516 to the clock input terminal of shift register 512. The shift register 512 is then connected by way of its output line 517 to a transmit unit 518 which is connected to the antenna 500 by way of T/R switch 501. The slave address decode and control unit 515 generally will be like the decode control unit involving gates 131-138 of FIG. 6 so that the master station can interrogate the slave station as to the data captured in the shift register 512.

The slave station includes a status sensor 520 connected by code lines 521 to register 512 for storage in register 512 of such data as may be desired in addition to the transit time difference data developed in counter 506. Timing at the master station based upon the range bit in shift register 176, FIG. 7, will provide a measure of the length of path 16, FIG. 1. A register in each DAU comparable to register 512 is shown in FIG. 8 as register 512a, 512b, 512c, comprising three separate shift registers connected in tandem.

Registers 512a, 512b and 512c of FIG. 8 will have status data from a unit 514 supplied thereto, which data is then fed to shift registers 176 by way of the status bit line 513. Data in the registers 512a, 512b and 512c, FIG. 8, preferably will include status information such as the elevation of the DAU, preamplifier gain setting, low cut filter setting, notch filter setting, high cut filter setting, low battery, voltage status, etc.

Each sensor and encoder unit 514 may include a conventional barometric pressure sensitive device which will provide an indication of the elevations of the DAUs involved. Interrogation of the DAU including its status register will provide an indication of the elevation of the DAU.

In the embodiment of the invention here described, the system included components well known and generally available from suppliers and manufacturers as follows:

| | |
|---|---|
| Flip-flops 101, 105 110b, 122, 124, 170, 261, 270, 271, 405, 406, 411 | RCA, Box 3200, Somerville, N.J. 08876, "D" Flip-flop Cat. # CD-4013A |
| Counter 107 | RCA Decade Counter Cat. # CD-4017A |
| Counters 113, 320 | RCA Decade Counters Cat. # CD-4029A |
| Counters 126, 177 | RCA Binary Counters Cat. # CD-4024A |
| Flip-flop 180 | RCA, Cat. # CD-4027A |
| Shift registers 175, 176, 512a, 512b, 512c | RCA 8 Bit Asynchronous Parallel In-Serial Out Shift Registers Cat. # CD-4021A |
| Parity Generator 280 | Motorola Semiconductor Products, Inc., Box 20912, Phoenix, Ariz. 85036 Cat. # MC-14531 |
| Counters 268, 275 | RCA Counters Cat. # CD-4040A |
| Counter 302 | RCA 14 Stage Ripple Counter Cat. # CD-4020A |
| Switches 201, 221 | RCA Tripple 2 Channel Switches, Cat. # CD-4053 |
| Op Amplifiers 202, 203, 204, 210, 211, 212, 213, 214, 240 | Fairchild Semiconductors, 313 Farchild Dr., Mountain View, Calif., Cat. # U5B7776393 |
| Op Amplifiers 242, 246, 253 | Siliconix, Inc., Santa Clara, Calif., Cat # L144AP |
| Op Amplifier 244 | Fairchild, Cat. # U5F7715393 |
| Op Amplifier 254 | Fairchild Cat. # U5B7740393 |
| Switches 243, 245 255 | RCA Switches Cat. # CD-4016 |
| Resistor 227 | 1.2K ohms |
| Capacitor 229 | 0.1 microfarad |

Shot point 10-shot control and time break communication, described in Operation and Maintenance Manual for Dinoseis Seismic Generator, Texas Instruments Incorporated, February 1966, reprinted July 1970.

Thus, in accordance with the preferred embodiment of the present invention a master RF station transmitts to source stations spread spectrum interrogation pulses. In response thereto, coded spread spectrum pulses representative of samples of the source signals are transmitted to the master station where they are multiplexed. Sampling of the respective signals is performed at uniform data sample intervals the duration of which is selected in relation to the frequencies of the signals whereby samples portrayed the time-amplitude variations of the signals. In normal seismic exploration procedures, seismic data sample intervals normally are of 0.002 to 0.004 second. For the purpose of this description, the phrase "uniform seismic data sample intervals" will be understood to mean intervals of the foregoing order. For higher frequency signals, shorter sample intervals will be desired. For lower frequency signals, longer seismic data sample intervals can be tolerated while still portraying in sufficient detail the time-amplitude variations of the signals. An array of seismic detections in land operations or a set of sonobuoys may thus be interrogated. Marine Hydrophones employed in seismic and in surveillance operations may compare the signal source employed herein. While the invention has been described in the setting of seismic exploration the operation is applicable to any continuous analog signal system where a high sample rate is required.

Having described the invention in connection with certain specific embodiments thereof, it is to be understood that further modifications may now suggest themselves to those skilled in the art and it is intended to cover such modifications as fall within the scope of the appended claims.

What is claimed is:

1. In data gathering operations the combination of:
   data acquisition units at each of a plurality of source stations in an area,
   a master station spaced from said units,
   a slave station spaced from said units and from said master station,
   means to transmit from said master station spread spectrum channel sync pulses,
   means at all said unit to receive and compress said sync pulses,
   means responsive to compressed pulses to initiate generation of a sample pulse train having a true first bit,
   means at said slave station responsive to said sync pulses to store a time lapse signal representative of time lapse between receipt at said slave station of one said sync pulse from said master station and said true bit from said data acquisition unit, and
   means at said slave station responsive to a predetermined sync pulse from said master station to transmit to said master station said time delay signal.

2. In seismic surveying the combination of:
   seismic data acquisition units at each of a plurality of detector stations,
   a master station spaced from said units,
   a slave station spaced from said units and from said master station,
   means to transmit from said master station spread spectrum channel sync pulses,
   means at all said unit to receive and compress said sync pulses,
   means responsive to compressed pulses to initiate generation of a sample pulse train having a true first bit,
   means at said slave station responsive to said sync pulses to store a time lapse signal representative of time lapse between receipt at said slave station of one said sync pulse from said master station and said true bit from said data acquisition unit, and
   means at said slave station responsive to a predetermined sync pulse from said master station to transmit to said master station said time delay signal.

3. In seismic exploration:
   a. generating seismic waves at a shot point;
   b. detecting the resulting seismic waves at a plurality of seismic detecting stations;
   c. from a master RF station spaced from said detector stations causing RF transmission of digital codes from all said detector stations in a predetermined sequence and in real time representative of the amplitudes taken at uniform seismic data sample intervals of said seismic waves detected at said detecting stations,
   d. from a slave station transmitting digital codes to said master station representative of RF travel times over paths therebetween at least one of which is by way of said detector stations, and
   e. multiplexing said codes received at said master station.

4. The method of claim 3 wherein:
   digital travel time codes are generated at said master station representing the RF range of each said detector station, and
   travel time codes are generated at said master station representing the RF range from said master station to each said detector station and thence to said slave station.

5. The method of claim 3 in which detector elevation code information is included with said digital codes from said detector stations.

6. In seismic exploration where seismic waves are generated at a shot point and the resulting seismic waves are detected at a plurality of seismic detecting stations, the combination which comprises:
   a. a master RF station spaced from said detector stations for securing RF transmission of digital codes from all said detector stations in a predetermined sequence and in real time representative of the amplitudes taken at uniform seismic data sample intervals of said seismic waves detected at said detecting stations,
   b. slave station means for transmitting digital codes to said master station, said codes being representative of RF travel times over paths therebetween at least one of which is by way of said detector stations, and
   c. means multiplexing said codes received at said master station.

7. The system of claim 6 in which sensor means generates a detector elevation code and sample means at said detector stations and includes elevation information in said digital codes from said detector stations.

* * * * *